3,147,266
MASTIC COATING COMPOSITION
Irvin J. Steltz, North Wales, and Grey F. Rolland, Trappe, Collegeville, Pa., assignors to Benjamin Foster Company, Philadelphia, Pa., a corporation of Delaware
No Drawing. Filed June 19, 1961, Ser. No. 117,799
9 Claims. (Cl. 260—28.5)

This invention relates to a mastic coating, and more particularly to a protective coating composition which is both heat and acid resistant.

Various types of mastic coatings are available on a commercial basis for protecting industrial processing equipment. Generally, these coatings possess mild heat and/or weather resistance and find application as coatings on insulation blocks and slabs, and on pipe coverings. Since, in many instances, the protective coating is applied to heated equipment it is essential that the mastic be not only heat resistant but also capable of expanding and contracting without deteriorating. In actual practice, it is well known that these prior art mastic coating compositions have not been entirely satisfactory due to their relatively poor heat resistance over extended periods of time, or at temperatures exceeding about 200° F. Under such adverse conditions these coatings have been observed to become hard and brittle and ultimately to crack and peel from the surfaces to which they have been applied.

Attempts have been made to produce acid resistant mastic compositions for use as protective coatings over specific types of acid processing equipment. Some progress has been realized in this field by combining certain epoxy resinous materials with asphalt or coal tar bases. However, these coatings are useful only in relation to relatively dilute acid material and are severely attacked by concentrated acid, especially mineral acids and are not suitable for use where elevated temperatures are encountered.

From the foregoing it will be apparent there exists a serious industrial need for protective coating compositions which possess a high degree of resistance to heat and acid. This need is especially acute in the construction and maintenance of industrial chimneys, for example, power plant chimneys, the interior surfaces of which are exposed not only to temperatures varying from 180 to 350° F. when in use, but also to acidic gases and water vapor from fuel combustion. These acidic gases, although also containing chlorine and hydrochloric acid, are composed predominantly of oxides of sulfur which condense with the water vapor within the chimney so that acidic solutions, concentrated to as much as 70 percent sulfuric acid have been known to build up within these structures. Such acidic solutions ultimately attack the insulation and the concrete and/or steel shell of these structures. This acid attack has become so severe in some cases that seepage of the acidic solutions has been observed on the exterior surfaces of the chimney walls in as litle time as one year after start-up of operations. Obviously, such attack causes severe damage to the concrete shell with attendant structural weakening.

With the foregoing in mind, the principal object of the present invention may be said to reside in the provision of an improved mastic coating composition which possesses a unique combination of both acid and heat resistance, which combination was not heretofore available to the art in the form of a mastic coating composition.

A further object of this invention is the provision of a substantially vapor-impermeable, highly flexible and heat flow resistant coating composition possessing excellent fly ash abrasion resistance properties.

A concomitant object of this invention is the provision of a novel mastic composition which possesses sufficient adhesive and cohesive strength and internal stress resistance qualities for use as a lining on masonry or steel surfaces in industrial construction where high resistance to both heat and acid are required.

The present invention is based upon the discovery that a composition consisting essentially of:

(1) From 27.5 to 36.5% by weight calculated on the basis of the non-volatile components contained therein of the total composition of a petroleum fraction condensation product derived from paraffin based crude oil residue;

(2) From 31.5 to 51.5% by weight, based on the non-volatile components of the petroleum fraction condensation product, of a chlorinated polyphenol having at least 50% molecularly combined chlorine;

(3) From 4.8 to 7.9% by weight (except as defined hereinafter by the preferred embodiment of this invention) based on the non-volatile components of the petroleum fraction condensation product, of an elastomer selected from the group consisting essentially of chlorosulfonated polyethylene and hexafluoropropylene-vinylidene fluoride copolymers; and (4) From 70 to 115% by weight, based on the non-volatile components of the petroleum fraction condensation product, of inert filler components, is exceptionally resistant to both high temperatures and acid concentrations, and is capable of retaining, to a large extent, its desired impermeability, flexibility and heat flow resistance properties over extended periods of use.

The petroleum fraction condensation product must be distinguished sharply from products derived from asphaltic based crude oils, since the former is a derivative of paraffin base crude oils. This paraffin petroleum fraction derivative is a chemical condensation product derived from a naturally contained, high molecular weight, viscous material precipitated from a warm propane solution of a residual paraffin base oil fraction which has undergone no thermal decomposition or chemical change beyond that induced by ordinary fractional distillation. This product is produced essentially by air blowing, at controlled rates, of the source material. The petroleum fraction condensation product has an iodine number not substantially above 40, a ball and ring softening point (ASTM E28–42T) between 120–140° F., a needle penetration value at 77° F. of 192 (ASTM D5–59T), a viscosity of 800 cps. (centipoises) at 313° F., and an average molecular weight of at least 1900, with at least 40 carbon atoms per double bond. This product is completely soluble in 88° Baumé naphtha and is virtually free of any asphaltenes. A method of preparing this condensation product is disclosed in greater detail in U.S. Patent No. 2,337,336, granted December 21, 1943, to McClure et al., and which is incorporated herein by way of reference.

In employing the petroleum fraction condensation product it is preferred to use a solution of this ingredient, since the product in its natural form is a viscous semisolid not readily handled for production purposes. Generally, such solutions are prepared by dissolving from 60 to 70% of the petroleum fraction condensation product in an organic solvent, particularly a hydrocarbon solvent, such as for example xylol, toluol or naphtha. Attention is called to the fact that although the common method of handling such product is in the form of a solution thereof, the ratios of the other components in the mastic compositions of this invention, as well as the amount of the petroleum fraction condensation product itself, are all calculated on the basis of the total or non-volatile components contained within such solution.

The petroleum fraction condensation product, must be present, as noted above, in the mastic composition in an amount of from 27.5 to 36.5%, by weight thereof, calculated on the basis of the non-volatile components. Where less than the 27.5% lower limit is employed the resulting mastic films will be found to have very little to essentially no heat and acid resistance qualities, to have inferior flexibility properties, and to be both porous and brittle after heating. Conversely, use of more than 36.5% of the petroleum fraction condensation product, calculated on the basis of non-volatile components, by weight of the total mastic composition results in films having substantially no heat flow resistance, and very poor internal stress resistance.

The chlorinated polyphenols, which as noted above must be present in amounts ranging from 31.5 to 51.5% by weight, based on the non-volatile components of the petroleum fraction condensation products, are resinous products having ball and ring softening points (ASTM 28–42T) of 212 to 222° F., a specific gravity of 1.670 (25/25° C.), a refractive index of 1.660–1.665 (20° C.), and a molecularly combined chlorine content of at least 50%. These products generally contain from 50 to 80% chlorine and are insoluble in water and glycerine, but soluble in most common organic solvents, thinners and oils. They are not readily oxidized, polymerized or condensed, but decompose above about 335° C. with the liberation of hydrogen chloride.

Where less than 31.5% of the chlorinated polyphenols, calculated on the weight of the non-volatile components of the petroleum fraction condensation product, are employed the resultant mastic film tends to become soft and tacky thereby losing resistance to heat, acid and abrasion, as well as losing their essential heat flow and flame spread resistance. Conversely, if more than 51.5% of a chlorinated polyphenol, based upon the non-volatile components of the petroleum fraction condensation product, is employed, the mastic coatings become hard and brittle, lose their required cohesive strength, and exhibit inferior heat resistance and appreciably lower vapor barrier resistance.

The essential elastomer components of the mastic compositions of this invention are selected from the group consisting of chloro-sulfonated polyethylene and hexafluoropropylene-vinylidene fluoride copolymers. Both of these products alone have been found to be essentially incompatible with the petroleum fraction condensation product, and attempts to obtain stable mixtures of these two components have failed completely to provide formulation stability. Moreover, formulations of mastic coating compositions wherein either one of the elastomer or petroleum fraction condensation product has been omitted, while resulting in stable compositions, fall far short of providing the necessary high temperature and acid resistance so essential in industrial applications.

In spite of the apparent incompatibility of these two essential components, it was surprisingly discovered that if the elastomer was employed within a narrow concentration range of from 4.8 to 7.9% by weight based upon the weight of the non-volatile components present in the petroleum fraction condensation product, and if there was added an amount of inert filler components, which amount ranged from 70 to 115% by weight of the weight of the non-volatile components present in the petroleum fraction condensation product, a completely stable mastic coating composition possessing the desired properties could be obtained.

The chloro-sulfonated polyethylene elastomers are waxy solids having specific gravities of from 1.10 to 1.28, and are soluble in hydrocarbon solvents such as benzene, toluene and xylene, and in esters and ketones. The hexafluoropropylene-vinylidene fluoride copolymers are white translucent solids having specific gravities ranging from 1.82 to 1.86, and are soluble in low molecular weight ketones.

Where less than 4.8% of the elastomer component is employed the resultant mastic coatings will be found to possess very poor internal stress resistance qualities, and essentially no heat or acid resistance. While it is desirable for improved elasticity, it has been found that if the amount of elastomer employed is greater than 7.9% by weight, based upon the weight of the non-volatile components present in the petroleum fraction condensation product, a separation of the elastomer will result thus causing porosity and reduced adhesion of the film with attendant loss of acid and heat flow resistance as well as brittleness in the coating.

As noted hereinabove, the inert filler components have been found to be essential in providing compatibilty and formulation stability to the other ingredients of the compositions of this invention. Applicants do not understand the mechanics whereby the filler components, themselves insoluble within these compositions, are capable of imparting this property to these mastic compositions, but have discovered that their presence is absolutely essential in order to achieve this result.

The amount of inert filler component may range from 70 to 115% by weight, based on the weight of the non-volatile components present in the petroleum fraction condensation product. If less than 70% of fillers are employed the elastomer component will not be compatible with the petroleum fraction condensation product and will separate from the composition, thereby resulting in a non-homogeneous composition having poor heat, acid and internal stress resistance, and substantially no heat flow resistance due to a relatively low viscosity of the composition. Conversely, if more than 115% by weight, as defined, of fillers are utilized there will result a porous mastic film having very poor to substantially no acid resistance, and too high a viscosity for practical use.

Fillers which have been found to be suitable for use in this invention include both the fibrous and the non-fibrous types. Examples of the fibrous type include both asbestine, also known as fibrous talc, glass fibers, and asbestos such as the mineral chrysotile asbestos. It is preferred to use asbestos which is available on a commercial basis under the designation Canadian classification 7R and which has a maximum fiber length of about $\frac{1}{16}$ inch. However, asbestos up to and including Canadian classification 5R, which has a maximum fiber length of about $\frac{1}{4}$ inch may be utilized in accordance with this invention. Generally, fibers longer than about $\frac{1}{4}$ inch are not employed since such long fibers tend to clog spraying apparatus frequently employed in applying these compositions, and compositions based on such fibers also trowel with difficulty.

The particle sizes of the fibrous ingredients are not critical to the stability of the compositions of this invention, but for ease of application, such compositions are preferably prepared using fibers of $\frac{1}{32}$ inch or shorter.

Non-fibrous fillers include silica, mica and granular talc. Depending upon the desired viscosity and application properties, the non-fibrous fillers may be incorporated as the sole filler component or in conjunction with fibrous fillers just so long as the total filler components fall within the range noted above.

A preferred composition falling within this invention is one which also contains from 0.1 to 3.5% by weight, based on the weight of the total mastic composition, of a gelling agent. The purpose of such agent is to control the flow properties of the finished mastic and to permit its application in thick films without running or sagging. Agents which have been found to be useful in this respect are organic derivatives, such as for example the dimethyldioctadecyl ammonium derivative, of the mineral montmorillonite. This mineral is reported to be a hydrous silicate of aluminum or magnesium and has an expanding lattice.

Where such gelling agent is employed it has been found desirable to pre-gel the agent prior to incorporating it into the mastic coating composition. This pre-gelling has been found to impart greater smoothness and homogeneity to the compositions, and to permit easier application of the mastic to surfaces to be protected. It has also been surprisingly discovered that use of such a gelling agent, pre-gelled before incorporation into the coating compositions, permits the preparation of stable compositions containing more than the 7.9% upper limit of elastomers referred to above. Compositions containing from 2.2 to 3.4% gelling agent have been prepared so as to contain as much as 12% elastomer component, based upon the weight of the non-volatile petroleum fraction condensation product employed, and to be completely stable over extended periods of storage.

The method used in pre-gelling this thickening agent has been found to be important if the increased elastomer solubility properties are desired. Such method comprises dissolving the amount of elastomer to be used with a suitable solvent, for example a hydrocarbon or a ketone solvent, depending upon the solubility properties of the elastomer employed, and with stirring, dispensing therein the desired quantity of the gelling agent, followed by the addition of a low molecular weight aliphatic alcohol, which is added in an amount of from 20% to 50% of the weight of the gelling agent used to form the gel. Proper pre-gelling of the thickening agent will not be achieved if this exact procedure is not followed.

So far as preparation of the mastic composition is concerned, several methods may be employed which include both dry and wet mixing techniques. For example, mastication of the solvent-free components may be effected by milling operation wherein all the ingredients are fed into a mill such as the "Banbury" type, and intimately mixed to yield a uniformly dispersed, homogeneous mass which can be used hot as is or which can be diluted with solvents for spray or trowel application.

A preferred method of mixing the components consists in utilizing a solution of the petroleum fraction condensation product to which are added initially, the requisite amounts of chlorinated polyphenol and fillers. It is important to understand at this point that attempts to blend the elastomer component into the petroleum fraction condensation product alone or combined with the chlorinated polyphenol will result in separation or precipitation of such elastomer due to its incompatibility with the petroleum fraction condensation product. The optimum method for incorporating the elastomer component comprises blending it into an admixture of the petroleum fraction condensation product, chlorinated polyphenol and inert fillers. More rapid blending may be obtained where a solution of the elastomer in a solvent is utilized. Where the preferred gelling or thickening agent is employed it may be premixed with the elastomer solution and pre-gelled prior to addition to the other components.

In general, the order of addition of the petroleum fraction condensation product, the chlorinated polyphenols and the fillers is not critical, the important consideration being the addition of the elastomer after the foregoing three components have been thoroughly blended together.

Application of the mastic coating composition may be by any convenient method, such as brushing, spraying or trowelling. There is no need for subjecting the coating to any ageing cycle prior to use. However, where the coating is to be applied by brush or spray application it is important that the amount of solvent which is added to obtain a workable solution does not exceed 40% by weight of the total mastic composition. Where more than 40% by weight of solvent is employed the composition tends to separate into a non-homogeneous admixture which, upon application, does not provide the desired properties of heat flow resistance or of heat and acid resistance.

Typical examples of mastic coating compositions prepared in accordance with the present invention are presented herewith merely by way of illustration, and are in no way intended to be construed as a limitation of this disclosure except as defined in the appended claims.

*Example I*

| Ingredient: | Parts by wt. |
|---|---|
| Petroleum fraction condensation product (66% solution in naptha) | 500 |
| Chlorinated polyphenol | 155 |
| Hexafluoropropylene-vinylidine fluoride copolymers | 21.1 |
| Asbestine | 250 |
| Asbestos floats | 40 |
| Mica | 40 |
| Hydrocarbon solvents | 44 |

*Example II*

Ingredients:

| | |
|---|---|
| Petroleum fraction condensation product (66% solution in naptha) | 500 |
| Chlorinated polyphenol | 163 |
| Chlorosulfonated polyethylene | 25 |
| Asbestine | 205 |
| Mica | 70 |
| Micaceous talc | 60 |
| Hydrocarbon solvents | 50 |

*Example III*

Ingredients:

| | |
|---|---|
| Petroleum fraction condensation products 66% solution in naphtha) | 400 |
| Chlorinated polyphenol | 120 |
| Chlorosulfonated polyethylene | 18.4 |
| Asbestine | 180 |
| Micaceous talc | 80 |
| Organic derivative of montmorillonite | 30 |
| Denatured ethyl alcohol | 15 |
| Hydrocarbon solvents | 36.6 |

The composition of Example III contains 3.4% gelling agent.

*Example IV*

| Ingredients: | Parts by wt. |
|---|---|
| Petroleum fraction condensation product (88% solution in xylol) | 710 |
| Hexafluoropropylene-vinylidine fluoride copolymer | 46.6 |
| Chlorinated polyphenol | 280 |
| Asbestine | 450 |
| Glass fiber | 60 |
| Asbestos fiber 7R | 80 |
| Mica | 60 |
| Organic derivative of montmorillonite | 60 |
| Denatured ethyl alcohol | 30 |
| Hydrocarbon solvents | 93 |

The composition of Example IV contains 3.2% gelling agent.

*Example V*

| Ingredients: | Parts by wt. |
|---|---|
| Petroleum fraction condensation product (66% solution in naphtha) | 650 |
| Chlorinated polyphenol | 136 |
| Chlorosulfonated polyethylene | 20.6 |
| Asbestine | 208 |
| Asbestos fiber 5R | 28 |
| Asbestos floats | 40 |
| Mica | 28 |
| Dimethyl - dioctadecyl - ammonium derivative of montmorillonite | 26.6 |
| Denatured ethyl alcohol | 13.3 |
| Hydrocarbon solvents | 41 |

The composition of Example V contains 2.2% gelling agent.

Ingredients: Parts by wt.
Petroleum fraction condensation product (66% solution in naphtha) ------ 400
Chlorinated polyphenol ------ 136
Hexafluoropropylene-vinylidine fluoride copolymer ------ 20.6
Asbestine ------ 180
Asbestos fiber 7R ------ 28
Asbestos floats ------ 40
Silica ------ 28
Mica ------ 28
Dimethyl - dioctadecyl - ammonium derivative of montmorillonite ------ 26.6
Denatured ethyl alcohol ------ 13.3
Hydrocarbon solvents ------ 41

The composition of Example VI contains 2.8% gelling agent.

Evaluation of the compositions of the present invention with respect to various properties which have been found to be essential in providing the necessary heat and acid resistance, as well as heat flow resistance, internal stress resistance, etc. is made in accordance with the following tests.

Property: Test method
Adhesion ------ ASTM C321–57.
Water vapor permeance ------ ASTM E96–53T.
Surface Flammability ------ ASTM E162–60T.
Heat Resistance ------ ASTM D747–58T.
Flexibility ------ Federal Standard 141 Method 6221.

*Fly ash abrasion resistance.*—No more than slight dulling or abrasion loss of the coating when applied to brick, dried or cured to constant weight, conditioned at 24 at 300° F. and subjected to the abrasive action of 10 pounds of fly ash through a ¼ inch nozzle on a two square inch area within 30 minutes in an air stream moving at a velocity of 120 feet per second, adjacent and parallel to the coated brick surface.

*Acid resistance.*—No more than very slight discoloration of the aqueous acid solutions and no disintegration of the coating when separate free films of ⅛ inch thickness, dried or cured to constant weight, are each exposed individually and separately for 100 days at 77° F., 140° F. and 200° F. each in 70% sulfuric acid, 5% sulfuric acid, 5% hydrochloric acid and 0.5% hydrofluoric acid.

We claim:
1. A mastic coating composition consisting essentially of:
 (a) from 27.5 to 36.5% by weight, calculated on the basis of the non-volatile components contained therein, of the total composition, of a petroleum fraction condensation product derived from paraffin based crude oil residues, said condensation product being characterized by an iodine number not substantially above 20, a ball and ring softening point between 120–140° F., a needle penetration value of 192 at 77° F., a viscosity of 800 cps. at 313° F., an average molecular weight of at least 1900, with at least 40 carbon atoms per double bond and being substantially completely soluble in 88° Baumé naphtha and virtually free of any asphaltenes;
 (b) from 31.5 to 51.5% by weight, based on the non-volatile components of said petroleum fraction condensation product, of a chlorinated polyphenol having at least 50% molecularly combined chlorine;
 (c) from 4.8 to 7.9% by weight, based on the non-volatile components of said petroleum fraction condensation product, of an elastomer selected from the group consisting essentially of chlorosulfonated polyethylene and hexafluoropropylene-vinylidene fluoride copolymers; and
 (d) from 70 to 115% by weight, based on the non-volatile components of said petroleum fraction condensation product, of inert fillers.

2. A mastic coating composition consisting essentially of:
 (a) from 27.5 to 36.5% by weight, calculated on the basis of the non-volatile components contained therein, of the total composition, of a petroleum fraction condensation product derived from paraffin based crude oil residues, said condensation product being characterized by an iodine number not substantially above 20, a ball and ring softening point between 120–140° F., a needle penetration value of 192 at 77° F., a viscosity of 800 cps. at 313° F., an average molecular weight of at least 1900, with at least 40 carbon atoms per double bond and being substantially completely soluble in 88° Baumé naphtha and virtually free of any asphaltenes;
 (b) from 31.5 to 51.5% by weight, based on the non-volatile components of said petroleum fraction condensation product, of a chlorinated polyphenol having at least 50% molecularly combined chlorine;
 (c) from 4.8 to 7.9% by weight, based on the non-volatile components of said petroleum fraction condensation product, of an elastomer selected from the group consisting essentially of chlorosulfonated polyethylene and hexafluoropropylene-vinylidene fluoride copolymers;
 (d) from 70 to 115% by weight, based on the non-volatile components of said petroleum fraction condensation product, of inert fillers; and
 (e) also containing from 0.1 to 3.5% by weight, based on the total weight of the said composition, of the dimethyl-dioctadecyl-ammonium derivative of the mineral montmorillonite.

3. A process for preparing a mastic coating composition which comprises adding to a solution of a petroleum fraction condensation product; said solution containing from 27.5 to 36.5% of the total composition of non-volatile components, and said petroleum fraction condensation product being derived from paraffin based crude oil residues, and being characterized by an iodine number not substantially above 40, a ball and ring softening point between 120–140° F., a needle penetration value of 192 at 77° F., a viscosity of 800 cps. at 313° F., an average molecular weight of at least 1900, with at least 40 carbon atoms per double bond and being substantially completely soluble in 88° Baumé naphtha and virtually free of any asphaltenes; from:
 (a) from 31.5 to 51.5% by weight, based on the non-volatile components of said petroleum fraction condensation product, of a chlorinated polyphenol having at least 50% molecularly combined chlorine;
 (b) from 4.8 to 7.9% by weight, based on the non-volatile components of said petroleum fraction condensation product, of an elastomer selected from the group consisting essentially of chlorosulfonated polyethylene and hexafluoropropylene-vinylidene fluoride copolymers; and
 (c) from 70 to 115% by weight, based on the non-volatile components of said petroleum fraction condensation product, of inert fillers.

4. A process for preparing a mastic coating composition which comprises adding to a solution of a petroleum fraction condensation product; said solution containing from 27.5 to 36.5% by weight of the total composition of non-volatile components, and said petroleum fraction condensation product being derived from paraffin based crude oil residues, and being characterized by an iodine number not substantially above 40, a ball and ring softening point between 120–140° F., a needle penetration value of 192 at 77° F., a viscosity of 800 cps. at 313° F., an average molecular weight of at least 1900, with at least 40 carbon atoms per double bond and being substantially completely soluble in 88° Baumé naphtha and virtually free of any asphaltenes, from:
 (a) from 31.5 to 51.5% by weight, based on the nonvolatile components of said petroleum fraction condensation product, of a chlorinated polyphenol having at least 50% molecularly combined chlorine;
 (b) from 4.8 to 7.9% by weight, based on the nonvolatile components of said petroleum fraction condensation product, of an elastomer selected from the group consisting essentially of chlorosulfonated polyethylene and hexafluoropropylene-vinylidene fluoride copolymers;
 (c) from 70 to 115% by weight, based on the nonvolatile components of said petroleum fraction condensation product, of inert fillers; and
 (d) also adding thereto from 0.1 to 3.5% by weight, based on the total weight of said coating composition, of the dimethyl-dioctadecyl-ammonium derivative of montmorillonite.

5. The composition of claim 1 wherein the elastomer is a chlorosulfonated polyethylene having a specific gravity of from 1.10 to 1.28.

6. The composition of claim 1 wherein the elastomer is a hexafluoropropylene-vinylidene fluoride copolymer having a specific gravity of from 1.82 to 1.86.

7. The composition of claim 1 wherein the fillers are selected from the group consisting of fibrous and nonfibrous fillers.

8. The composition of claim 2 wherein the elastomer component is present in an amount of from 4.8 to 12% by weight, based on the non-volatile components of the petroleum fraction condensation product and wherein the dimethyl-dioctadecyl-ammonium derivative of the mineral montmorillonite is present in an amount of from 2.2 to 3.4% by weight of the total mastic composition.

9. The process of claim 3 wherein there is incorporated from 0.1 to 3.5% by weight of the total coating composition of the dimethyl-dioctadecyl-ammonium derivative of the mineral montmorillonite.

No references cited.